Patented May 29, 1951

2,554,980

UNITED STATES PATENT OFFICE 2,554,980

EXTRACTION OF DIKETONES FROM COMPLEX MIXTURES CONTAINING OTHER KETONES

Louis L. J. Fauqué, Premery, France, assignor to Sific Aktiengesellschaft, Glarus, Switzerland, a corporation of Switzerland No Drawing. Application September 22, 1947, Serial No. 775,562. In France July 10, 1947

8 Claims. (Cl. 260—593)

It is well known that, to extract a substance from the medium in which it exists, crystal combinations may be used as intermediary steps in the operation. However, when said medium is a complex medium on account of the presence of several components having properties similar to those of the substance to be extracted, extraction by means of such a method becomes impossible. For example, the property of sodium bisulphite of forming crystal combinations with aldehydes and ketones cannot be used to extract a particular ketone from a mixture of several ketones and aldehydes the corresponding combination being mixed with combinations due to other components.

The present invention relates to a method which makes it possible to extract, by crystallization, $\alpha$-diketones from a complex mixture containing other ketones and possibly aldehydes, and particularly from the complex mixture of ketones and aldehydes obtained when carbonizing wood and generally known under the name of methylene-oils.

The said method consists mainly in treating the mixture, from which the $\alpha$-diketones must be separated, by an $\alpha$- or $\beta$-glycol, then in crystallizing the said mixture, in purifying the crystals thus obtained through one or more recrystallizations, in decomposing the purified crystals through hydrolysis by means of a mineral acid such as sulphuric acid, and in separating the diketones to be extracted by distillation of the decomposition products.

It has been found that $\alpha$-diketones form crystal combinations with $\alpha$- and $\beta$-glycols, which are heat-stable in a neutral or basic medium, or even in the presence of a fatty acid but easily decomposed into their components, through hydrolysis, in the presence of a mineral acid.

As a glycol there can be used, for instance, for the treatment according to the invention, ethylene-glycol or one of its $\alpha$- or $\beta$- homologues, or even a cyclanic glycol such as cyclopentanediol.

The treatment of the mixture by glycol is carried out preferably under brisk stirring, at a temperature ranging between 50° and 70° C. It is best to operate with a mixture highly concentrated in diketones.

The mixture from which the diketones are to be extracted must not contain a great proportion of alcohol, such as methyl-alcohol, for the latter would combine partly with the diketones to give liquid ketals, which, on the one hand, cannot be easily separated from the other oils and obtained pure, and, on the other hand, would diminish the quantity of crystallized $\alpha$-diketones-glycol combination obtained, and, thence, the quantity of extracted $\alpha$-diketones.

The optimum duration for the treatment of the mixture with the glycol used depends on the nature of the latter and the diketone concentration of the mixture to be treated, and must be determined by previous experiments for each particular case.

This treatment can be facilitated and accelerated by adding to the mixture a small quantity of mineral acid, such as hydrochloric acid or sulphuric acid, which acts as a catalyst.

The crystalline combination can be obtained either by distilling the mixture treated with glycol or by allowing it to settle for 24 hours or more, crystallization being possibly accelerated by cooling down.

The following are two examples of operation of the method according to the invention:

Example I

To 100 grams of methylene-oils having the following properties:

Mobile liquid, dark brown, offensive odour $$D_4^{15°} = 0.9017$$

distilling between 80° and 95° C. in pseudo-azeotropic mixture with water and containing 50% diacetyl, are added 124 grams of ethylene-glycol and 1% pure sulphuric acid acting as a catalyst. The mixture is kept in a water-bath at 60° C., for one hour, under brisk stirring. Through settling and cooling down, there is formed a cluster of matted crystals which is dried, purified by recrystallization in alcohol, then decomposed by hydrolysis in the presence of a trace of mineral acid.

Diacetyl distils in a pseudo-azeotropic mixture with water, the layer rich in diacetyl is re-distilled and yields pure diacetyl. The glycol is recovered by distillation of the distillation residue.

Example II

To 100 grams of the same methylene-oils as in Example I are added 124 grams of ethylene-glycol and 1% pure sulphuric acid. The reaction mixture is kept at 60° C. for one hour under brisk stirring. There is then added 40 gr. of a 10% solution of sodium acetate, after which the whole is distilled, if necessary by steam-action, the residue being fractionated under vacuum. The diacetyl-ethylene-glycol combination is thus recovered, almost pure. When recrystallized once in alcohol, it yields pure diacetyl after having been treated as indicated in Example I.

What I claim is:

1. A method of extracting substantially pure α-diketones from complex mixtures obtained from the carbonizing of wood containing a plurality of compounds including other ketones and aldehydes generally known as methylene oils comprising adding a glycol selected from the group consisting of α- and β-glycols to said mixture, mixing and reacting the glycol with said α-diketone thereby forming a crystalline reaction product, separating the formed crystalline reaction product, purifying the formed crystalline product by recrystallization, decomposing the purified crystals by hydrolysis by means of a mineral acid, and separating the diketone from the decomposition product by distillation.

2. A method of extracting substantially pure α-diketones from complex mixtures obtained from the carbonizing of wood containing a plurality of compounds including other ketones and aldehydes generally known as methylene oils comprising adding a glycol selected from the group consisting of α- and β-glycols to said mixture, mixing and reacting the glycol with said α-diketone at temperatures of about 50° to 70° C. thereby forming a crystalline reaction product, separating the formed crystalline reaction product, purifying the formed crystalline product by recrystallization, decomposing the purified crystals by hydrolysis by means of a mineral acid, and separating the diketone from the decomposition product by distillation.

3. A method of extracting substantially pure α-diketones from complex mixtures obtained from the carbonizing of wood containing a plurality of compounds including other ketones and aldehydes generally known as methylene oils comprising adding a glycol selected from the group consisting of α- and β-glycols to said mixture, mixing and reacting the glycol with said α-diketone in the presence of a mineral acid catalyst thereby forming a crystalline reaction product, separating the formed crstalline reaction product, purifying the formed crystalline product by recrystallization, decomposing the purified crystals by hydrolysis by means of a mineral acid, and separating the diketone from the decomposition product by distillation.

4. A method of extracting substantially pure α-diketones from complex mixtures obtained from the carbonizing of wood containing a plurality of compounds including other ketones and aldehydes generally known as methylene oils comprising adding ethylene glycol to said mixture, mixing and reacting the ethylene glycol with said α-diketone thereby forming a crystalline reaction product, separating the formed crystalline reaction product, purifying the formed crystalline product by recrystallization, decomposing the purified crystals by hydrolysis by means of a mineral acid, separating the diketone from the decomposition product by distillation, and separating the ethylene glycol from the residue by distillation.

5. A method of extracting α-diketones from complex mixtures in purified form comprising mixing ethylene glycol with a complex mixture obtained from the carbonizing of wood containing of the order of 50 per cent of diacetyl and of the order of 50% of a plurality of compounds including ketones and aldehydes thereby reacting the glycol with the diacetyl and forming a crystalline reaction product, separating the formed crystalline reaction product, purifying the formed crystalline product by recrystallization, decomposing the purified crystals by hydrolysis by means of a mineral acid, and separating the diacetyl from the decomposition product by distillation.

6. A method of extracting α-diketones in a purified form from complex mixtures obtained from the carbonizing of wood containing a plurality of compounds including other ketones and aldehydes generally known as methylene oils comprising adding at least 2 mols of ethylene glycol per mol of α-diketone in said mixture, mixing and reacting the ethylene glycol with said α-diketone thereby forming a crystalline reaction product, separating the formed crystalline reaction product, purifying the formed crystalline product by recrystallization, decomposing the purified crystals by hydrolysis by means of a mineral acid, and separating the diketone from the decomposition product by distillation.

7. A method of extracting substantially pure α-diketones from complex mixtures obtained from the carbonizing of wood containing a plurality of compounds including other ketones and aldehydes generally known as methylene oils comprising adding a glycol selected from the group consisting of α- and β-cyclanic glycols, mixing and reacting the glycol with said α-diketone thereby forming a crystalline reaction product, separating the formed crystalline reaction product, purifying the formed crystalline reaction product by recrystallization, decomposing the purified crystals by hydrolysis by means of a mineral acid, and separating the diketone from the decomposition product by distillation.

8. A method of extracting substantially pure α-diketones from complex mixtures obtained from the carbonizing of wood containing a plurality of compounds including other ketones and aldehydes generally known as methylene oils comprising adding cyclopentanediol to said complex mixture and reacting it with said α-diketone thereby forming a crystalline reaction product, separating the formed crystalline reaction product, purifying the formed crystalline reaction product by recrystallization, decomposing the purified crystals by hydrolysis by means of a mineral acid, and separating the diketone from the decomposition product by distillation.

LOUIS L. J. FAUQUÉ.

REFERENCES CITED

The following references are of record in the file of this patent:

UNITED STATES PATENTS

| Number | Name | Date |
|---|---|---|
| 2,401,335 | Calder et al. | June 4, 1946 |

FOREIGN PATENTS

| Number | Country | Date |
|---|---|---|
| 619,628 | Germany | Oct. 11, 1935 |